Figure 1:
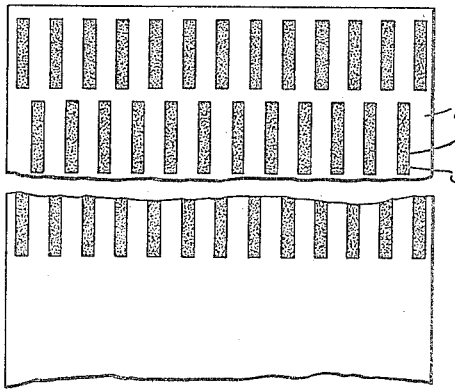
Figure 2:
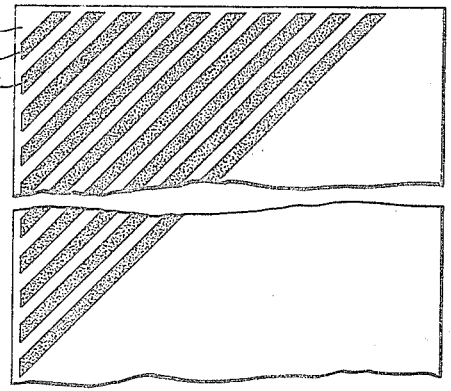
Figure 3:
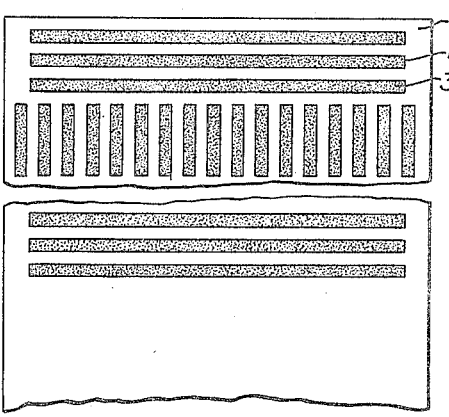

W. H. KEMPTON.
SELF LUBRICATING BEARING AND METHOD OF MAKING THE SAME.
APPLICATION FILED DEC. 14, 1918.

1,430,560.                              Patented Oct. 3, 1922.

WITNESSES:
H. T. Shelhamer
O. E. Bee.

INVENTOR
Willard H. Kempton
BY
Wesley G. Carr
ATTORNEY

Patented Oct. 3, 1922.

1,430,560

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

SELF-LUBRICATING BEARING AND METHOD OF MAKING THE SAME.

Application filed December 14, 1918. Serial No. 266,690.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Self-Lubricating Bearings and Methods of Making the Same, of which the following is a specification.

My invention relates to self-lubricating bearings, and it has for its primary object the provision of bearings which possess great mechanical strength and insure efficient lubrication.

It is obvious that self-lubricating bearings possessing sufficient mechanical strength to have durable wearing qualities and which insure efficient lubrication throughout the term of their usefulness are very desirable in many machines, as they avoid, to a great extent, the attention otherwise required by the machine during its operation. In view of this, one object of my invention is to construct self-lubricating bearings by superimposing layers of sheet material impregnated with a binder of such character that, when subjected to heat and pressure, it will impart great mechanical strength to the sheet material and also by so inserting a lubricant in the structure of the bearing that good lubrication will result at all times.

Bearings have been constructed, heretofore, by superimposing layers of sheet material impregnated with a binder and distributing a lubricant, such as graphite, in their structure but, although such bearings are of sufficient mechanical strength for certain uses, they are open to criticism because of the fact that the graphite, being distributed over the sheet material, is used up at certain times and exposes the bare sheet material to direct wearing engagement with the elements which they support. The sheet material thus exposed, not being lubricated, is liable to damage the parts with which it comes in contact. With this in view, one object of my invention is to provide a bearing in which the lubricant shall, at all times, be present on the surfaces in contact and thus eliminate any danger of undue wear.

Another object of my invention is to construct a self-lubricating bearing which may be formed in long tubes, cut into short sections and machined to exact dimensions, thus promoting rapid production.

A further object of my invention is to provide a bearing in which any degree of lubrication desired may be readily obtained.

A still further object of my invention is to provide a self-lubricating bearing which will be unaffected by oils, moisture, wide temperature changes, weak acids and alkalis.

With these and other objects in view, my invention will be more fully described; illustrated in the drawings, in the several views of which corresponding numerals indicate like parts, and then particularly pointed out in the claims.

Figure 5:
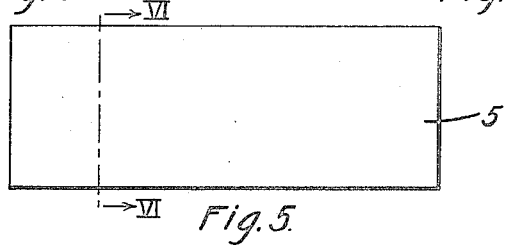
Figure 6:
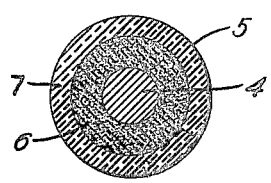

In the drawings, Figs. 1, 2, 3 and 4 illustrate various modifications of a method of treating sheet material preparatory to constructing a bearing in accordance with my invention; Fig. 5 is a side elevation of a bearing constructed in accordance with my invention, and Fig. 6 is a cross sectional view taken along the line VI—VI of Fig. 5.

I may construct a bearing, embodying my invention, by employing suitable sheet material such as paper, muslin or duck treated with a binder such, for example, as a phenolic condensation product. A lubricant may be embodied in the bearing by perforating the sheet material and disposing the lubricant in the perforations. The lubricant may be mixed with a binder to facilitate its disposal in the perforations in the sheet material or it may be disposed in the perforations in a pure state, if desired.

The bearing may be formed by first perforating the sheet material and disposing in these perforations a lubricant, such as graphite mixed with a phenolic condensation product, after which the sheet material, which is also treated with a phenolic condensation product or a similar binder, may be wound upon a mandrel having a desired diameter until a suitable thickness has been reached. The body, thus formed, may then be placed in a mold and subjected to heat and pressure to compact the material and to harden the binder. The depth of lubrication may be governed by the number of perforations provided in the sheet. If it is desired that the bearing contain a lubricant throughout its entire structure, the sheet material may be perforated along its entire length or it may be perforated to any extent thereof and thus provide lubrication in the finished bearings to the desired depth.

Figure 4:
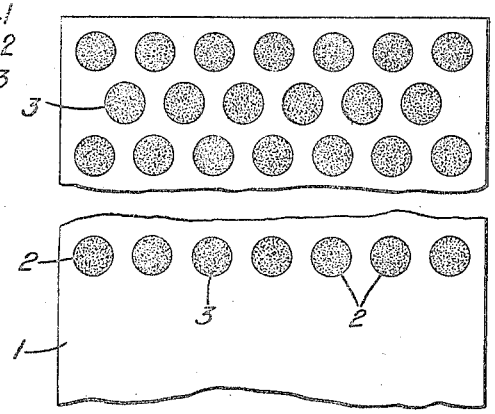

I prefer to construct a bearing by perforating sheet material 1 substantially as indicated in Fig. 1, Fig. 2, Fig. 3 or Fig. 4 and have found that perforations of the shape shown in Fig. 4, are exceptionally desirable. However, it is obvious that openings, any one or more of many different forms and sizes may be employed, in which a lubricant may be disposed, though care should be taken to distribute the openings in such manner that the lubricant will be disposed at intervals throughout the entire bearing surface of the finished bearing. I have discovered, by extensive tests, that paper impregnated with a phenolic condensation product, forms a durable and satisfactory bearing.

A sheet of impregnated paper 1 may be perforated, as shown at 2 in Fig. 4, to a sufficient degree of length and a lubricant 3 may be disposed in the perforations 2 so that when the treated material is wound about a mandrel 4 and cured to form a bearing 5, a depth of from $\frac{1}{32}''$ to $\frac{1}{8}''$ of material 6 containing the lubricant is formed and the remainder 7 of the bearing is composed of treated paper containing no lubricant. A bearing thus formed, after being subjected to heat and pressure in a mold, may be readily machined to exact dimension and has such mechanical strength that it may be pressed into the bore of a metal pulley or other machine element. The perforations may be so disposed, without undue weakening of the material, that, during the entire life of the bearing, approximately one-half of the bearing surface may contain a lubricant.

Various lubricants may be employed but I have found that graphite, mixed with a small quantity of a phenolic condensation product, is desirable. A binder of this character employed with a lubricant, when subjected to heat and pressure, tends to increase the wearing quality of the lubricant without destroying its lubricating qualities and, furthermore, the entire structure is made more nearly uniform by employing this method. A bearing, such as shown in Fig. 5, may be constructed by employing sheet material of the exact width of the finished article or a sheet of greater width may be employed and a long tube formed which, after being molded, may be cut into sections, as desired. However, by employing wide sheet material, quantity production of the bearings may be increased without sacrificing any desirable qualities of their structure.

Although I have described and shown a plurality of forms of bearings in which the principle of my invention is embodied, it is obvious that, with minor changes, various other modifications may be produced, and I desire, therefore, that no limitations shall be imposed except such as are indicated in the appended claims.

I claim as my invention:

1. A self-lubricating bearing comprising windings of fibrous sheet material impregnated with a hardened binder and inserts of graphite in some of said windings.

2. A self-lubricating bearing comprising superimposed layers of fibrous sheet material impregnated with a hardened binder, the innermost layers of said material being perforated and a lubricant disposed in said perforations.

3. A self-lubricating bearing comprising windings of fibrous sheet material impregnated with a hardened phenolic condensation product and inserts of graphite.

4. A self-lubricating bearing comprising superimposed layers of perforated sheet material impregnated with a hardened binder and a lubricant disposed in said perforations.

5. A self-lubricating bearing comprising superposed layers of perforated paper impregnated with a hardened phenolic condensation product and a molding composition of graphite and a phenolic condensation product molded in said perforations.

6. A method of making self-lubricating bearings that comprises perforating sheet material, impregnating it with a binder, disposing a lubricant in said perforations, winding the sheet material about a mandrel and subjecting the body thus formed to heat and pressure in a mold.

7. A method of making self-lubricating bearings that comprises perforating a sheet material to a certain extent of its length, impregnating it with a binder, disposing a lubricant mixed with a binder in said perforations, winding the sheet material about a mandrel and subjecting the body thus formed to heat and pressure in a mold.

8. A method of making self-lubricating bearings that comprises perforating a sheet material to a certain extent of its length, impregnating it with a phenolic condensation product, disposing graphite mixed with a phenolic condensation product in said perforations, winding the sheet material about a mandrel and subjecting the body thus formed to heat and pressure in a mold.

In testimony whereof, I have hereunto subscribed my name this 29th day of Nov. 1918.

WILLARD H. KEMPTON.